United States Patent  (10) Patent No.: US 9,671,777 B1
Aichele et al.  (45) Date of Patent: Jun. 6, 2017

(54) TRAINING ROBOTS TO EXECUTE ACTIONS IN PHYSICS-BASED VIRTUAL ENVIRONMENT

(71) Applicant: TruPhysics GmbH, Stuttgart (DE)

(72) Inventors: Fabian Aichele, Leinfelden-Echterdingen (DE); Albert Groz, Stuttgart (DE)

(73) Assignee: TruPhysics GmbH, Stuttgart (DE)

( * ) Notice: Subject to any disclaimer, the term of this patent is extended or adjusted under 35 U.S.C. 154(b) by 0 days.

(21) Appl. No.: 15/188,932

(22) Filed: Jun. 21, 2016

(51) Int. Cl.
G06F 19/00 (2011.01)
G05B 19/4069 (2006.01)
B25J 9/16 (2006.01)

(52) U.S. Cl.
CPC ........ G05B 19/4069 (2013.01); B25J 9/1666 (2013.01)

(58) Field of Classification Search
None
See application file for complete search history.

Primary Examiner — Bhavesh V Amin
(74) Attorney, Agent, or Firm — Georgiy L. Khayet

(57) ABSTRACT

A disclosed system includes a physically plausible virtual runtime environment to simulate a real-life environment for the simulated robot and a test planning and testing component operable to receive task data based used to create a plurality of plausible tests for at least one robot control program. The plurality of plausible tests is designed to execute at least one task associated with the task data. The test planning and testing component is further operable to define test parameters for each of the plurality of plausible tests. The system further includes a robot controller operable to execute the plurality of plausible tests substantially simultaneously on the simulated robot, analyze results of the execution to select an optimized robot control program from the at least one robot control program, and based on the analysis, selectively optimize the test associated with the optimized robot control program.

29 Claims, 6 Drawing Sheets

TRAINING ROBOTS TO EXECUTE ACTIONS IN PHYSICS-BASED VIRTUAL ENVIRONMENT

TECHNICAL FIELD

This disclosure relates generally to testing robots and, more specifically, to testing robots in a physics-based simulation environment.

BACKGROUND

The approaches described in this section could be pursued but are not necessarily approaches that have previously been conceived or pursued. Therefore, unless otherwise indicated, it should not be assumed that any of the approaches described in this section qualify as prior art merely by virtue of their inclusion in this section.

Physical laws in the real world are taken for granted. The behavior and properties of physical objects are well-studied and well-understood subjects in science and engineering. In virtual reality, this is entirely different—simulated worlds offer no built-in mechanisms for simulating the physical laws that govern our daily life. Almost exclusively focused on visual effects and simple environment interaction like in computer games, special care has to be taken to augment virtual environments with realistic classical mechanics. At the same time, it is crucial not to impair interactive experience of a user by requiring long computation times (e.g., less than twenty five frames per second) for operating a simulation. The biggest challenge in the field of mechanically plausible virtual reality applications is to achieve the best possible compromise between the level of detail of the simulated environment and the runtime requirements of the simulation itself.

The degrees of complexity of control programs are wide—it comprises deterministic sequences of trajectories as found for example in arc welding and plug-and-play applications where no dynamic modifications to trajectories are necessary. Assembly and handling tasks are examples of robotic applications that may need to compensate variations in work piece positions (including search strategies to detect target points). Such tasks require live information from the working environment in order to dynamically react to changing states and conditions. Partially or fully automated robotic applications are even more complex, as they require the online execution and coordination of numerous tasks (e.g., localization and mapping, object recognition, and handling) to enable robots to achieve their tasks. The idea to use simulation software for both designing and verifying control programs and algorithms in both industrial and service robotics has been known, as can be seen by a wide variety of software applications currently available (e.g., Gazebo, Webots, KUKA SimPro, and Siemens RobotExpert). However, these simulation frameworks are currently not suitable for testing processes for interaction with real environment in a high degree of mechanical interaction between tools and work pieces. Additionally, these simulation networks are highly dependent on real-time sensor data from the working environment. The simulation frameworks are often restricted in their ability to check highly detailed geometric models of robots, tools, work pieces, and other objects for contacts or overlaps in or close to real-time.

A robot is only as reliable as the software that controls it. To provide developers and users with a continuous development process, applying virtual reality technology to developing and testing smart robotics applications, before the real hardware is available, is highly advisable. Such an approach lowers the risk of downtimes and defects caused by control software errors and helps to make robots more reliable in collaboration with humans.

Comparable software solutions include:
Finite element method (FEM) applications that use both highly detailed geometric and computational models to provide realistic models for the physical (e.g., mechanical, thermodynamic) behavior of simulated objects. However, these applications have very high runtime requirements that lead to a huge offset between simulation and real-time, thus making them inadequate for interactive applications.

Physics engines as commonly used in computer games and state-of-the-art robotic simulation frameworks. These engines are specifically designed to meet real-time constraints but this advantage is offset by the fact that it is necessary to use extremely simplified geometric models of simulated objects to keep the required computation times low. In addition, these engines only offer very basic computational models for classical mechanics, ignoring all but the most basic properties of mechanical objects. This fact severely limits the usefulness of these engines for challenging simulation applications in industrial and service robotics.

Multi-body systems focus on simulating the dynamic behavior of mechanical assemblies, with similar focus on realistic models as in the case of FEM systems. Accordingly, the runtime requirements of such simulation systems are not suitable for real-time operation.

Test frameworks—in software development, software tests are common. To validate software programs for bugs and semantic arrays in the code, unit tests have to be created to run, for example, after every commit. Control programs for complex robotic tasks are largely composed of instructions that cannot be tested using conventional software tools. To test robot programs for functionality in the real world, a usual software test is not sufficient. A whole function/task unit test is needed to validate whether the movements and actions (that are controlled by a program) based on physical events are successful.

Currently, robots can be programmed using a method where a human can bring a robot into the right position by a teaching pendant. Moreover, program solutions for programming the robots can include off-line programming to create a program independent of an actual robot cell. The robot program may be uploaded to a real industrial robot for execution. The robot cell may be represented via a graphical three-dimensional model in a simulator. The off-line programming and simulator tools may be used to create optimized program paths for the robot to perform a specific task. The simulation of the robot program may be based on robot movements, reachability analysis, collision and near-miss detection, cycle time reporting, and other factors.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The present disclosure is related to systems and methods for training a simulated robot to execute tasks in a physics-based simulated environment. According to one embodiment of the disclosure, a system for training a simulated robot to execute tasks in a physics-based simulated environment may include a physically plausible virtual runtime environment to simulate a real environment for the simulated robot, a test planning and testing component, and a robot controller. The test planning and testing component may be operable to receive task data. Furthermore, the test planning and testing component may be operable to create a plurality of plausible tests for at least one robot control program. The creation may be based on the task data. The plurality of plausible tests may be designed to execute at least one task associated with the task data. The test planning and testing component may be further operable to define test parameters for each of the plurality of plausible tests. The robot controller may be operable to execute the plurality of plausible tests substantially simultaneously on the simulated robot. The robot controller may be further operable to analyze test results of execution of the plurality of plausible tests to select an optimized robot control program from the at least one robot control program. The robot controller may be operable to selectively optimize a plausible test associated with the optimized robot control program. The optimization may be based on the analysis.

In another embodiment of the disclosure, a method for training a robot to execute a task in a physics-based simulated environment is provided. The method may commence with determining a physically plausible virtual environment for a simulated robot. Thereafter, the method may continue with receiving task data. The method may further include creating a plurality of plausible tests for at least one robot control program. The creation may be based on the task data. The plurality of plausible tests may be designed to execute at least one task associated with the task data. Furthermore, the method may include defining test parameters for each of the plurality of plausible tests. The method may continue with executing the plurality of plausible tests substantially simultaneously on the simulated robot. Furthermore, the method may include analyzing test results of execution of the plurality of plausible tests to select an optimized robot control program from the at least one robot control program. A plausible test associated with the optimized robot control program may be selectively optimized. The optimization may be based on the analysis.

Additional objects, advantages, and novel features will be set forth in part in the detailed description, which follows, and in part will become apparent to those skilled in the art upon examination of the following detailed description and the accompanying drawings or may be learned by production or operation of the example embodiments. The objects and advantages of the concepts may be realized and attained by means of the methodologies, instrumentalities, and combinations particularly pointed out in the appended claims.

BRIEF DESCRIPTION OF THE DRAWINGS

Embodiments are illustrated by way of example, and not by limitation, in the figures of the accompanying drawings, in which like references indicate similar elements.

DETAILED DESCRIPTION

Figure 1:
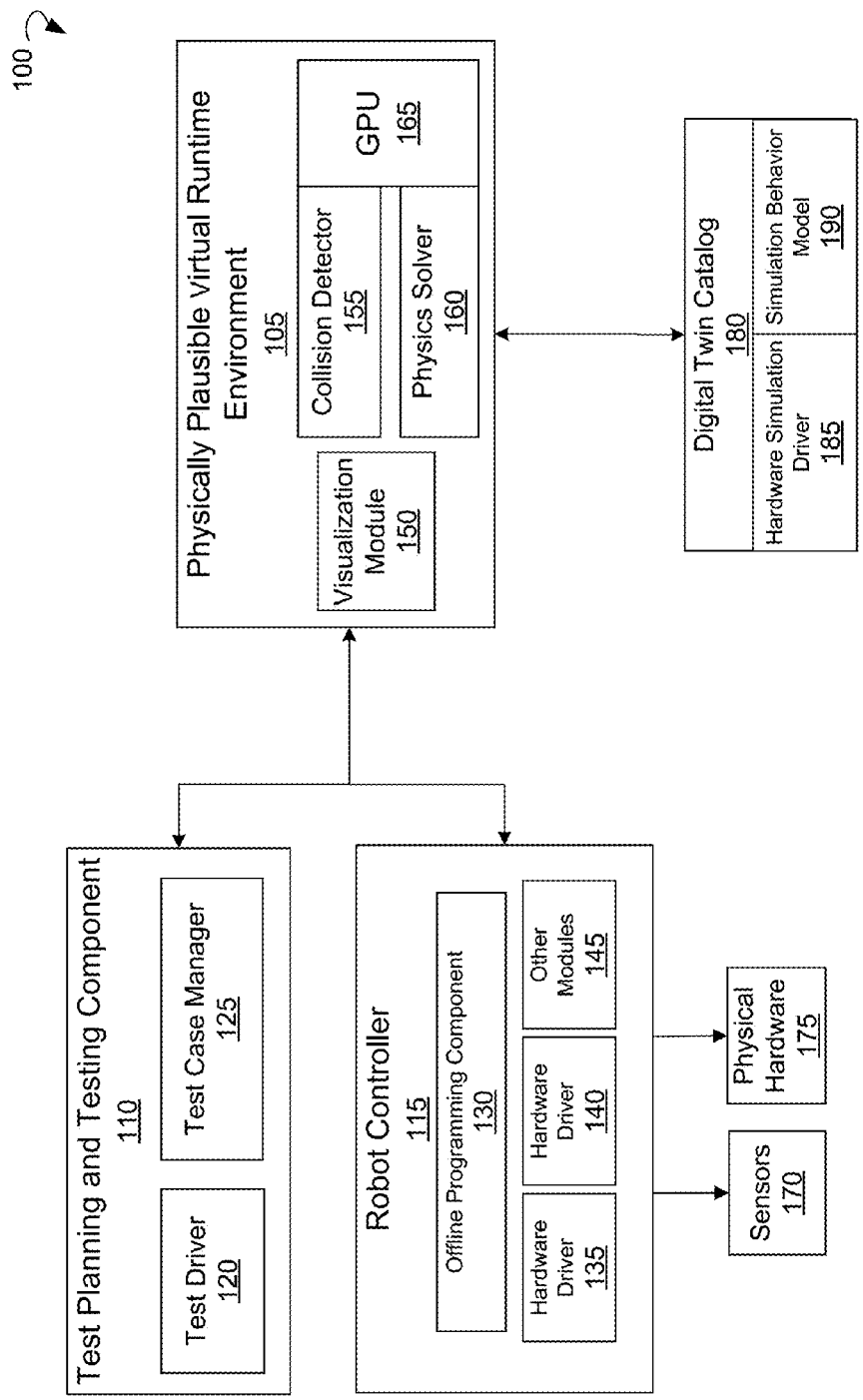
FIG. 1 shows an example environment, within which methods and systems for training a simulated robot to execute tasks in a physics-based simulated environment can be implemented.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

The techniques of the embodiments disclosed herein may be implemented using a variety of technologies. For example, the methods described herein may be implemented in software executing on a computer system or in hardware utilizing either a combination of microprocessors or other specially designed application-specific integrated circuits, programmable logic devices, or various combinations thereof. In particular, the methods described herein may be implemented by a series of computer-executable instructions residing on a storage medium, such as a disk drive or computer-readable medium. It should be noted that methods disclosed herein can be implemented by a computer (e.g., a desktop computer, tablet computer, laptop computer), game console, handheld gaming device, cellular phone, smart phone, smart television system, and so forth.

The present disclosure relates to methods and systems for training a simulated robot to execute tasks in a physics-based simulated environment. More specifically, a continuous process of a manual, semi- or fully-automatic development, debugging and deployment of robot control programs and test patterns in a physics-based simulation environment is described. This process is supported by a Hardware-in-the-Loop (HWIL) simulation framework, tools, and sensors operating in a real-time virtual 3-dimentional (3D) environment.

In general, the method for training a simulated robot to execute tasks in a physics-based simulated environment of the present disclosure involves program planning software to generate multiple variations of task execution and optimize parameters based on results of tests for robot control programs. The method further involves a virtual runtime environment for robotic applications. The virtual runtime environment may include a Graphics Processing Unit (GPU)-based collision detector to compute contacts between complex 3D geometries and a mechanical simulation framework to provide plausible mechanical behavior based on Newtonian physics. Moreover, a HWIL approach can be employed for interfacing robot control hardware and/or algorithms with the virtual runtime environment. Furthermore, a software framework can be used for testing and debugging robot control programs based on data computed in and/or provided to the virtual runtime environment.

The virtual runtime environment is a tool that can substitute real working environments for robotic software applications with a virtual runtime environment. More specifically, the virtual runtime environment, on one hand, generates relevant sensor data (e.g., visual, tactile) and, on the other hand, computes the consequences of actions (e.g., actuator movements, object manipulation) a robot undertakes. Therefore, the runtime environment enables the closed-loop operation of perception, reasoning and action sequences that are the basic building blocks of any robotic software application on top of a virtual reality.

The method for training a simulated robot to execute tasks in a physics-based simulated environment of the present disclosure is performed using a GPU-based collision and FEM-computing algorithms that allow real-time capable simulation of rigid-body and soft-body physical objects, a test framework for manual, semi- or fully-automated tests of robot control programs and algorithms running and recording user-defined test cases, and a HWIL integration of real control hardware or algorithms. The real-time capable simulation of rigid-body and soft-body physical objects may be augmented with soft-body dynamics, skeleton-muscle systems, and simplified FEM models. Additionally, user-assisted or autonomous optimization of control programs may be performed. The method may also allow for an unsupervised task planning using machine learning.

Referring now to the drawings, FIG. 1 illustrates an environment 100 within which methods and systems for training a robot to execute a task in a physics-based simulated environment can be implemented. The environment 100 may include a system for training a robot to execute a task in a physics-based simulated environment. The system for training a robot to execute a task in a physics-based simulated environment may include a physically plausible virtual runtime environment 105, a test planning and testing component 110, and a robot controller 115. The physically plausible virtual runtime environment 105 can be used to simulate a real environment for the simulated robot.

The test planning and testing component 110 may include a test driver 120 and a test case manager 125. The test driver 120 may be operable to provide coordination of the robot controller 115 and events occurring during the execution of tests. The test case manager 125 may be operable to create test criteria, archive robot control programs associated with test cases, archive results of execution of tests, archive events occurring during the execution of tests, and the like. The test planning and testing component 110 may be operable to receive task data. Based on the task data, the test planning and testing component 110 may create a plurality of plausible tests for a robot control program. The plurality of plausible tests may be designed to execute a task associated with the task data. The test planning and testing component 110 may be further operable to define test parameters for each of the plurality of plausible tests.

The robot controller 115 may include an offline programming component 130, a plurality of hardware drivers shown as a hardware driver 135 and a hardware driver 140, and other modules 145. The robot controller 115 may be connected with a physical hardware 175 (such as a physical robot). The robot controller 115 may be further operable to execute the plurality of plausible tests substantially simultaneously on the simulated robot. The robot controller 115 may be connected to a sensor 170 to sense parameters associated with the simulated robot during the execution of the plausible tests. Upon obtaining results of the execution, the robot controller 115 may analyze the test results of the execution to select an optimized robot control program from the robot control programs. Based on the analysis, the robot controller 115 may selectively optimize a plausible test associated with the optimized robot control program.

In an example embodiment, the physically plausible virtual runtime environment 105 may include a GPU 165. A GPU-based collision detection mechanism may be implemented by a collision detector 155 and a physics solver 160. In an example embodiment, the GPU-based collision detection mechanism may be used during the analysis of the test results of the execution. The collision detector 155 may be used to compute contacts between at least two 3D geometries in real time. The detection of contacts between two 3D geometries can include detection of collisions between objects with complex 3D geometries in real-time. The physics solver 160 may be operable to determine contact forces and impulses, analyze kinematics and material behavior (e.g., deformation), and so forth.

The GPU-based collision detection mechanism may be used to employ General Purpose Graphics Processing Unit (GPGPU) hardware to check Computer-Aided Design (CAD)-constructed 3D geometries for possible contacts. Additionally, the GPU-based collision detection mechanism may be used to employ a hybrid bounding volume hierarchy and a spatial hashing approach to allow for a high degree of parallelized processing. In a further example embodiment, the GPU-based collision detection mechanism may be used to employ a hybrid geometry data representation that combines both polygonal surface descriptions and a compressed point cloud data format to enable an operation of both spatial hashing and geometry feature-based intersection computation approaches. The GPU-based collision detection mechanism may be optimized for virtual environments with a high number of possibly intersecting, moving concave triangle meshes and with both the geometric data representation and scheduling strategies being employed for planning and executing intersection checks.

The physically plausible virtual runtime environment 105 may further include a FEM-based mechanism for virtual prototyping of rigid-body physical objects and soft-body physical objects in real time. Additionally, the physically plausible virtual runtime environment 105 may include a mechanical simulation framework for providing plausible mechanical behavior based on Newtonian physics.

In a further example embodiment, the physically plausible virtual runtime environment 105 may include a HWIL simulation framework. The HWIL simulation framework may be configured to interface between the robot controller 115 and the physically plausible virtual runtime environment 105. More specifically, a physical robot and a robot environment may be simulated and controlled by connecting the control hardware or control algorithms of the physical robot to a virtual model provided by the physically plausible virtual runtime environment 105.

The physically plausible virtual runtime environment 105 may be connected to a digital twin catalog 180. The digital twin catalog 180 may have a hardware simulation driver 185 and a simulation behavior model 190. The digital twin catalog 180 may store data associated with digital twins. The digital twins may include environment objects and controlled objects. Based on a type of the task and the purpose of the task, a plurality of environment objects (also referred to as "objects") associated with the test may be recognized (i.e., physical objects, such as a glass to be gripped by the simulated robot according to the test). Information associated with the objects may be stored in the digital twin catalog 180, such as object types, object parameters, and object properties. The object properties may include a viscosity, a mass, a rigidity, a fragility, a shape, a physical behavior, and so forth. Furthermore, the object parameters stored in the digital twin catalog 180 may include a CAD-model for visual modelling of the object, collision geometry for calculating geometry of collision and force handling, elastic behavior for further planning of motion and force control (e.g., when gripping a deformable object), kinematics for determining degrees of freedom (e.g., joint limits), friction properties for calculating demanded force to hold an object, a FEM-based model (e.g., a tetrahedron-based model) for simulation of deformation (material properties like deformation structure may be needed for this model), multiple phases materials for determining two phase (e.g., skin and on bones), maximum force before braking, a weight per measurement unit for calculating the weight of the whole object, and further physical behavior models.

The controlled objects may include simulated robots or parts of simulated robots (e.g., grippers). The information associated the simulated robots and stored in the digital twin catalog 180 may include Application Program Interface (API)-to-controller parameters used to control a digital twin with a physical controller or a virtualized controller.

Additionally, the physically plausible virtual runtime environment 105 may include a software framework. The software framework may be applicable for testing and optimizing robot control programs based on data computed in the physically plausible virtual runtime environment or provided to the physically plausible virtual runtime environment.

The physically plausible virtual runtime environment 105 may further include a visualization module 150 for visualizing the simulated robot during the execution of plausible tests.

In an example embodiment, the system for training a simulated robot to execute tasks in a physics-based simulated environment may further include a database. The database may be operable to store data associated with indexing, searching, and retrieval architecture for robots, tools, workpieces, working environments, mechanical and material properties of objects, kinematics, mechatronic properties and behavior models of robots, mechatronic properties and behavior models of actuators, sensors, models for sensors and actuator faults, template building blocks for trajectories, motion plans, object recognition, handling and manipulation tasks, patterns and a framework supporting decision making Artificial Intelligence software, and so forth.

In a further example embodiment, the system for training a simulated robot to execute tasks in a physics-based simulated environment may further include a robot, i.e. a physical robot. The robot may be operable to execute the at least one task upon running the optimized robot control program on the robot controller.

The system for training a simulated robot to execute tasks in a physics-based simulated environment provides a virtual commissioning of a physical robot by supporting developers and engineers during design, implementation, and testing phases for industrial assembly facilities (such as physical robots) using virtual reality technology. Physics-based robot simulation operations are used to test tasks on a simulated robot before the physical robot is available and installed. Design and test modifications can be provided to existing processes associated with physical robots by preparing and testing changes to existing processes and robot control programs implementing them without having to stop production operations associated with the physical robots. Moreover, a post-mortem analysis may be performed for the physical robots via simulation by reproducing failures, which occurred in assembly lines of the physical robots.

Furthermore, the system for training a simulated robot to execute tasks in a physics-based simulated environment may provide a virtual training environment to teach and train engineers, software developers, and workers to operate robots and equipment associated with the robots before actually using physical robots. Ergonomics and reliability studies may be provided for worker assistance systems by simulation of tools and devices (e.g., robot arms amplifying human worker's strength during abrasive work-piece machining) and interaction of the tools and devices with a simulated model of the human skeleton-muscle apparatus.

Additionally, a human-robot collaboration can be provided by safety analysis and risk assessment for tasks that require human workers and robotic equipment to work together in close proximity. Moreover, the system for training a simulated robot to execute tasks in a physics-based simulated environment can provide a learning process for optimization of robot behavior and task results in service and industrial robotics.

Figure 2:
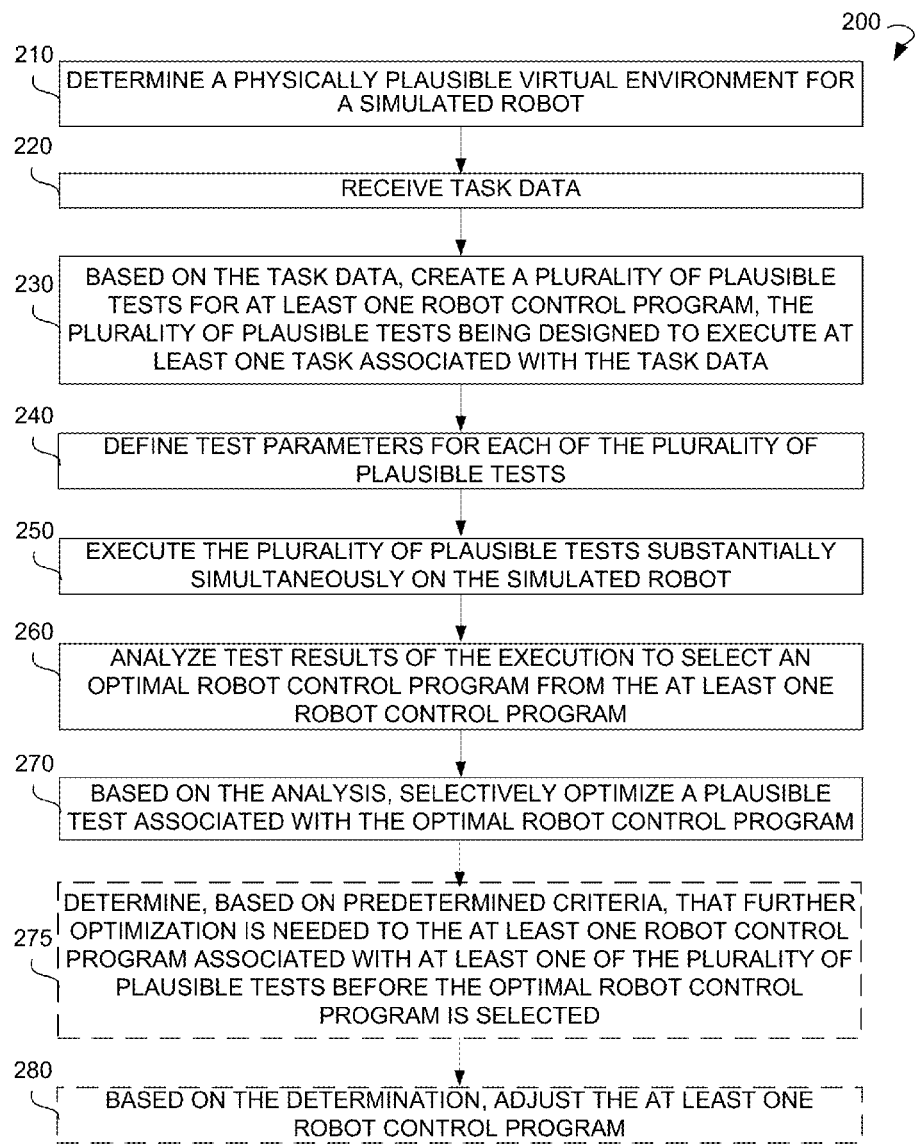
FIG. 2 is a process flow diagram of a method for training a robot to execute a task in a physics-based simulated environment, according to an example embodiment.

FIG. 2 is a process flow diagram of a method 200 for training a robot to execute a task in a physics-based simulated environment, according to an example embodiment. The method 200 may commence with determining a physically plausible virtual environment for a simulated robot at operation 210. In an example embodiment, the physically plausible virtual environment may include a virtual 3D environment running in real time. The physically plausible virtual environment may be configured to generate plausible sensory data. In an example embodiment, the plausible sensory data may include at least one of the following: an electrical emulation of a sensor, an electrical emulation of an actuator, visual data, tactile data, ambient data, visual feedback of an execution of the optimized robot control program on the simulated robot, and the like.

In some embodiments, the determining of the physically plausible virtual environment of the simulated robot is performed by recognizing at least one object associated with the simulated robot and classifying the at least one object based on data received from a digital twin catalog. The classification may be based on at least one of the following properties of the at least one object: a viscosity, a mass, a rigidity, a fragility, a shape, a physical behavior, a kinematical behavior, and so forth.

Additionally, based on the classification, further data concerning the at least one object may be obtained. Specifically, the further data may be obtained from metadata of a digital twin associated with the at least one object. The physically plausible virtual environment of the simulated robot may be generated based on the metadata of the digital twin.

At operation 220, task data may be received. In an example embodiment, the task data may be obtained from a database, such as a historical database. The task data may be indicative of at least one part of at least one robot control program to be tested. In an example embodiment, the task data may include a gripping process and a combination of a plurality of subtasks. Additionally, the task data may include user-defined result criteria. In an example embodiment, the method 200 may further include providing a human-machine interface (HMI) operable to receive the task data. The HMI may be further operable to receive commands using at least one of the following: a text, a voice, and a gesture.

Based on the task data, a plurality of plausible tests for at least one robot control program may be created at operation 230. The plurality of plausible tests may be designed to execute at least one task associated with the task data. The at least one task for the plurality of plausible tests may be automatically selected based on a description of the at least one task in the task data. In other words, the task for the plausible test associated with the robot control program can be retrieved from the database based on a description of a result that the plausible test associated with the robot control program need to achieve when executed on the simulated robot.

Additionally, a description of the working environment of a physical robot may be obtained from the database. Therefore, a task for the plausible test associated with the robot control program retrieved from the database can be automatically adjusted to the working environment based on the description of the working environment.

In an example embodiment, the plurality of plausible tests may include at least one of the following: tests of the same scenario for different control programs, tests of different scenarios for the same control program, tests of the same scenario with different test parameters for the same control program, and so forth.

At operation 240, test parameters for each of the plurality of plausible tests may be defined. Upon defining the test parameters, operation 250 may be performed, at which the plurality of plausible tests may be executed substantially simultaneously on the simulated robot. In some embodiments, plausible tests associated with a robot control program may be repeatedly executed on the simulated robot, either sequentially or in parallel, each time applying variations of user-specified properties or environmental conditions in a given test case (i.e., according to the task data). Based on the execution of the plausible tests, test results (also referred herein to as results of the execution) of the execution of the plausible tests may be obtained. The results of the execution may be saved for further review. During the execution of the plausible tests, ambient conditions may be varied. Moreover, events occurring during the execution of the plausible tests may be logged.

At operation 260, the results of the execution may be analyzed to select an optimized robot control program from the at least one robot control program. In an example embodiment, the method 200 may further include defining passing criteria (i.e. a "correct result") for the plurality of plausible tests. The results of the execution may be compared to the passing criteria. In this embodiment, the selection of the optimized robot control program may be based on whether the passing criteria are satisfied. The plausible tests may be associated with sub-parts of the robot control programs. Therefore, the correctness of sub-parts of the robot control programs can be determined automatically based on the passing criteria without requiring user assistance.

In further example embodiments, the plausible tests may be associated with the entire robot control program. Therefore, the passing criteria that are required to be met for a correct or desired result of the robot control program may be defined. Thus, the error-free execution of the entire robot control program can be determined without requiring manual assistance. Additionally, one or more predetermined actions may be triggered based on the results of the execution of the plurality of plausible tests.

In an example embodiment, the analysis of the results of the execution may include collision detection by computing contacts between complex 3D geometries in real time. During the collision detection, contact forces and impulses may be determined, kinematics and material behavior may be analyzed. The collision detection is described in detail with reference to FIG. 3.

Figure 3:
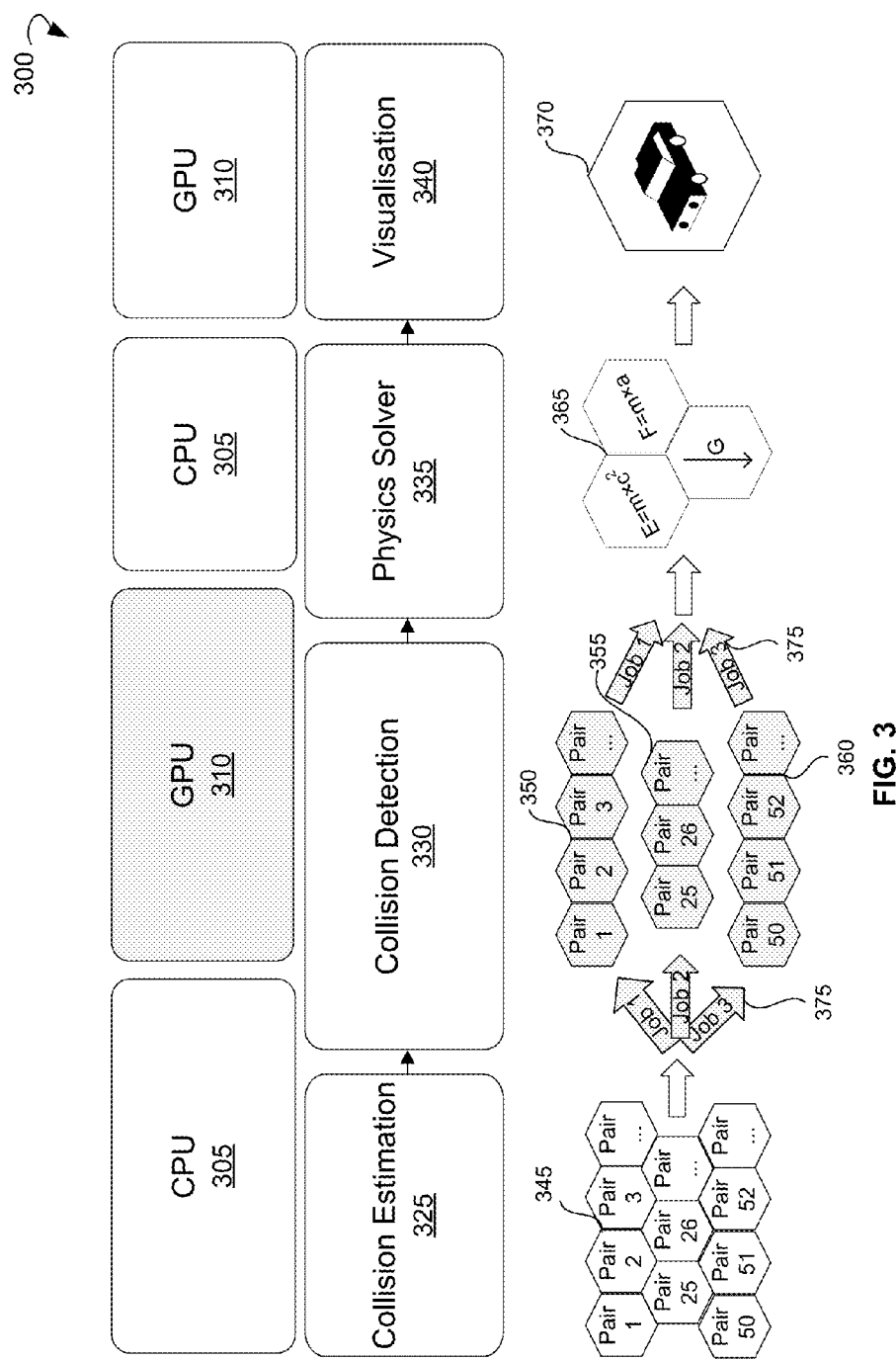
FIG. 3 is a block diagram showing a collision detection process, according to an example embodiment.

FIG. 3 is a block diagram 300 showing a collision detection process, according to an example embodiment. A central processing unit (CPU) 305 may perform collision estimation at step 325. The step 325 may be performed for a plurality of collision pairs 345. A collision pair may include two 3D objects that collide during the execution of the test. At step 330, the GPU 310 may perform collision detection. The collision detection may be run in parallel queues on a plurality of cores associated with the GPU 310. More specifically, the collision detection may be divided into a plurality of jobs 375. Each job 375 may be associated with collision pairs (shown as collision pairs 350, 355, and 360) and may be directed to a separate core. The cores may further direct data associated with the collision pairs 350, 355, and 360 to the CPU 305 for performing the step 335 of solving physics problems associated with collisions (contact forces, impulses, kinematics, and so forth) using Newtonian physics principles 365. The CPU 305 may provide the processed data to the GPU 310 for visualizing results 370 at step 340.

Referring again to FIG. 2, based on the analysis, a plausible test associated with the optimized robot control program may be selectively optimized at operation 270. In some embodiments, the results of execution may be classified into categories. The categories may include at least one of the following: a success, a fail, a partial success, a near success, and so forth. The success may be based on meeting at least one of the following criteria: spatial, temporal, and logical. During the optimization, a category associated with the plausible test may be determined and the plausible test may be optimized based on this category. The execution of the optimized robot control program on the simulated robot may include an actuator movement, an object manipulation, and so forth. In an example embodiment, the method 200 may further include executing the optimized robot control program on a physical robot.

In some example embodiments, the optimization may include adjusting the test parameters based on the results of the execution of the plurality of plausible tests. The test parameters associated with the robot control program may be adjusted automatically by employing machine learning and without requiring human supervision, for example, based on results of the execution of the plausible tests and the given criteria for correctness. In further example embodiments, the optimization may include minimizing execution time or movement distances during task execution.

In an example embodiment, the method 200 may further optionally include operation 275 directed to determining that further optimization is needed to at least one robot control program associated with at least one of the plurality of plausible tests before the optimized robot control program is selected. Such determination may be based on predetermined criteria. At operation 280, the at least one robot control program may be adjusted based on such determination.

The method 200 may further include storing test execution data to a database. The test execution data may be associated with the results of the execution. Therefore, storing the test execution data may include storing the optimized robot control program with associated test cases and corresponding simulation results to the historical database.

Figure 4:
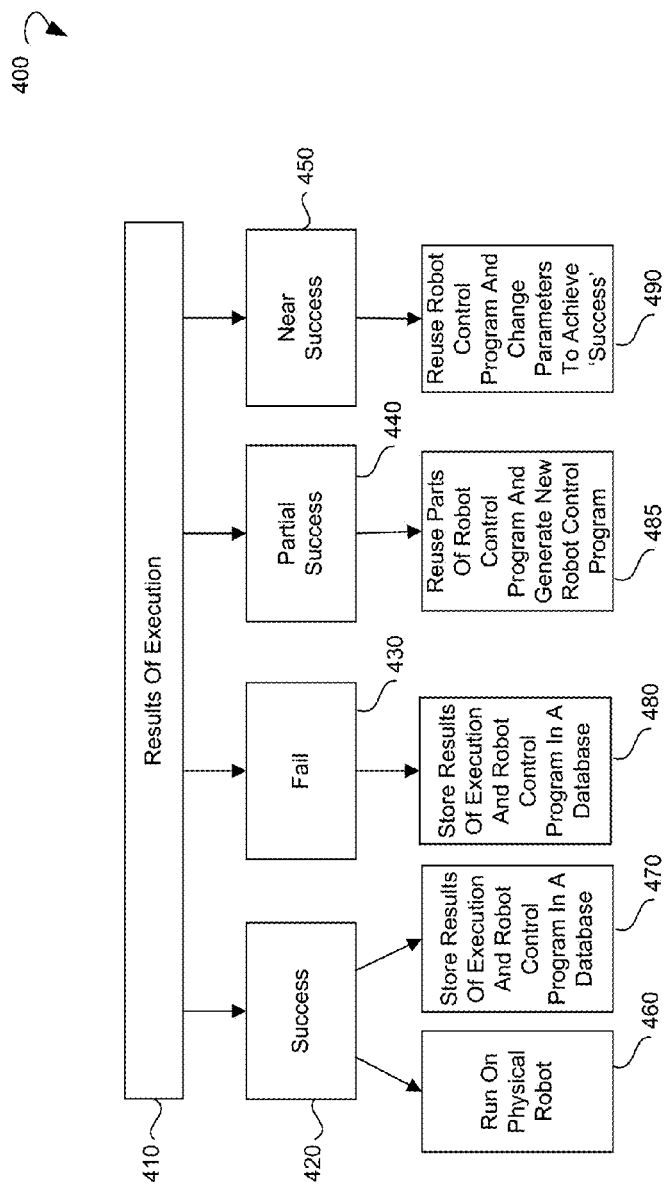
FIG. 4 is a block diagram showing actions performed based on test results of execution of plausible tests, according to an example embodiment.

FIG. 4 is a block diagram 400 showing actions performed based on the results of execution of plausible tests, according to an example embodiment. The tests may be executed and results of execution 410 may include a success result 420, a fail result 430, a partial success result 440, and a near success result 450.

In case of the success result 420, a step 460 may be performed by running the plausible test associated with the success result 420 on a physical robot. Moreover, the results of execution determined to be 'success' and a robot control program associated with the test that resulted in the 'success' results of the execution may be stored to a database at step 470.

In case of the fail result 430, the results of execution determined to be 'fail' and a robot control program associated with the test that resulted in the 'fail' results of execution may be stored to the database at step 480. The data associated with the 'fail' results may be used to understand why the robot control program did not work.

In case of the partial success result 440, the parts of robot control program associated with test that resulted in the 'partial success' results of execution may be reused to generate new robot control program at step 485. For example, the partial success result 430 may show that the simulated robot can reach and pick an object used in a test but the place of the object may need to be re-planned.

In case of the near success result 450, the robot control program associated with test that resulted in the 'near success' results of execution may be reused and some parameters of the robot control program may be adjusted at step 490 to achieve 'success' results of execution.

Figure 5:
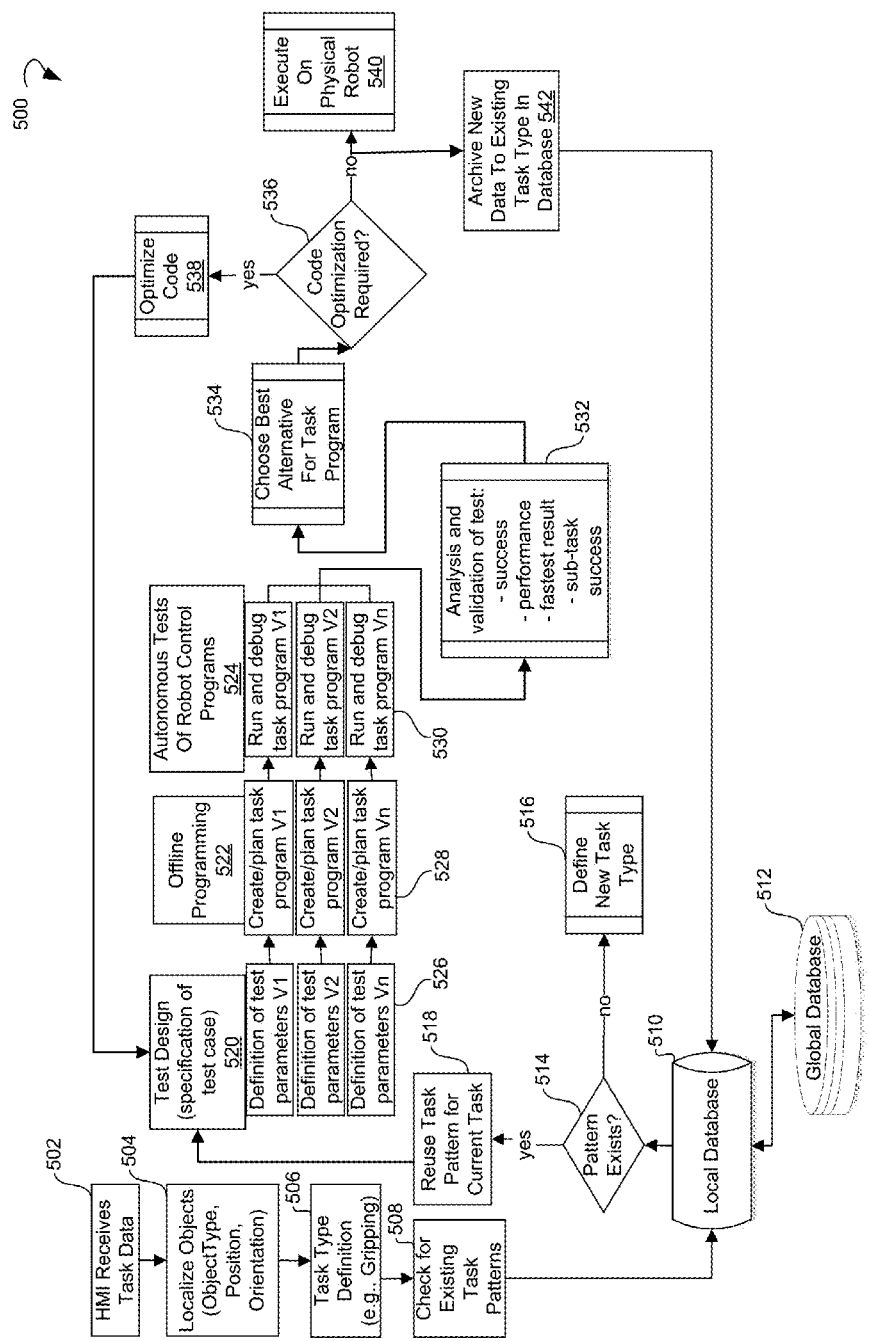
FIG. 5 is a block diagram of an example method of training a simulated robot to execute tasks in a physics-based simulated environment, according to an example embodiment.

FIG. 5 is a block diagram showing an example method 500 of training a simulated robot to execute tasks in a physics-based simulated environment, according to an example embodiment. The method 500 may commence with receiving task data by an HMI at block 502. Multiple possibilities may be available for receiving commands from the HMI, such as voice recognition, an HMI tablet, gesture recognition, and so forth. The task data, such as the purpose or definition of a task and task type can be entered as a command by voice, text (e.g., via keyboard), or gestures. At block 504, objects associated with the test may be determined based the task data, such as object type, position, orientation, and so forth. At block 506, the task type can be determined. The task type may include a gripping process, or a complex task including a combination of multiple subtasks, for example "bring me a drink". The task type may have abstract or precise success criteria, which may include special, temporal, logical, and other parameters.

Specifically, based on the task type and the purpose, the object may be recognized and the object type may be classified based on a digital twin catalog. Classification may be based on properties like viscosity, mass, rigidity, fragility, shape, physical and kinematical behavior, and so forth. After classifying the object type, further information concerning the object may be obtained from metadata associated with a digital twin of the object. Based on the metadata associated with the digital twin, a simulation environment may be simulated for the object. Depending on the generated simulation environment, the optimized mode to execute and fulfil the task and the expected criteria from user (abstract or precise) may be defined.

At block 508, checking for existing task patterns may be performed. The task patterns may include plausible tests applicable for execution of the test according to the test data. More specifically, a local database 510 may be assessed for existing task patterns. Additionally, a global database 512 may be assessed for existing task patterns.

At a decision block 514, if no existing task pattern is found, a new task type may be defined at block 516. If at least one existing task pattern is found at the decision block 514, a task pattern may be reused for the current task at block 518.

At block 520, a test design, i.e. a specification of a test case, may be determined based on the task pattern. To determine an optimized mode of the task pattern in the current test, multiple versions of the same task pattern may be generated with small variations at block 526. The variability of the versions can be based on the set-up of a range of speed, friction, ways of reaching a parameter, and so forth. More specifically, multiple versions of definitions of test parameters may be provided at block 526. The definitions of test parameters may be provided to offline programming at block 522 for creating or planning robot control programs at block 528 for each of the multiple versions of test parameters. At block 524, the tests associated with robot control programs may be executed by running and debugging multiple versions of the robot control programs shown by block 530.

The analysis and validation of the results of execution may be performed at block 532. The parameters of the analysis and validation may include a success of the results of execution, performance, fastest result, sub-task success, and so forth. The user may define criteria for results of execution of tests with reference to events/actions for handling the results of execution. The results of execution can be categorized based on physics and behavior simulation. The results of execution can be obtained as stimuli from the simulated environment, which may be set by the test parameters and changed by the interaction with the robot. The stimuli can include contact signals (e.g., glass achieved the final position), events signals (e.g., glass gets full with water), occurrence of an unexpected event (glass slips or falls down because of a gripper; glass is broken because of structure parameters in case of high force).

After the analysis, the optimized robot task program may be selected at block 534. A decision block 536 may include determining whether optimization of a program code associated with the optimized control program is necessary. If no optimization is needed, data associated with the current test and task type may be archived in a database (the local database 510 or the global database 512) at block 542. Furthermore, the robot control program may be executed on a physical robot at block 540. If optimization is needed, the program code associated with the optimized robot control program may be optimized at block 538 by sending corresponding instructions and data to block 520.

Figure 6:
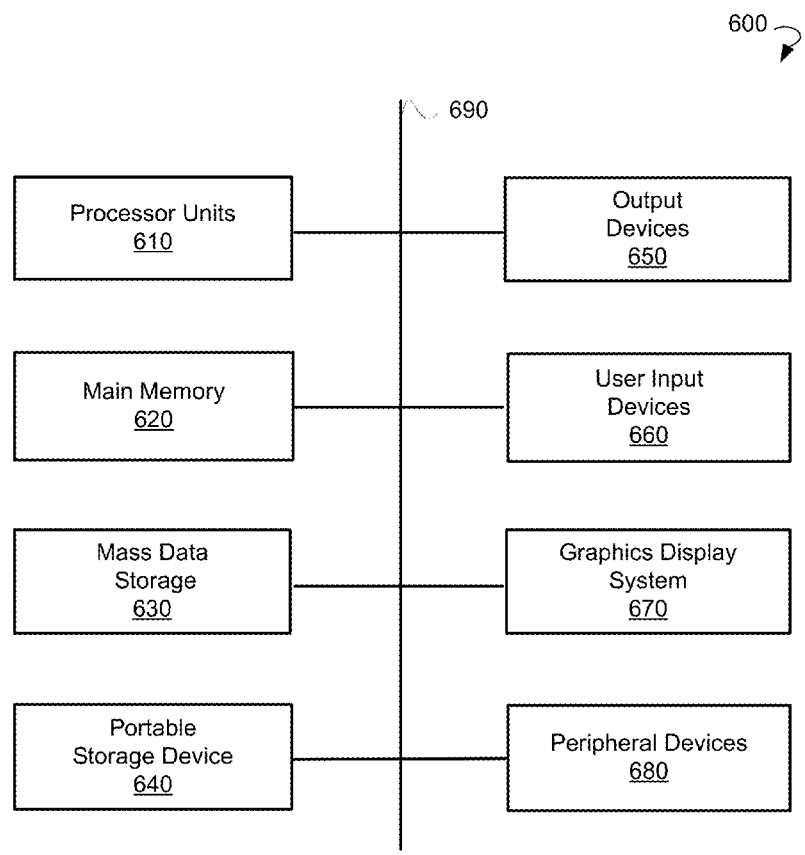
FIG. 6 is a diagrammatic representation of a computing device for a machine, within which a set of instructions for causing the machine to perform any one or more of the methodologies discussed herein can be executed.

FIG. 6 illustrates a computer system 600 that may be used to implement embodiments of the present disclosure, according to an example embodiment. The computer system 600 may serve as a computing device for a machine, within which a set of instructions for causing the machine to perform any one or more of the methodologies discussed herein can be executed. The computer system 600 can be implemented in the contexts of the likes of computing systems, networks, servers, or combinations thereof. The computer system 600 includes one or more processor units 610 and main memory 620. Main memory 620 stores, in part, instructions and data for execution by processor units 610. Main memory 620 stores the executable code when in operation. The computer system 600 further includes a mass data storage 630, a portable storage device 640, output devices 650, user input devices 660, a graphics display system 670, and peripheral devices 680. The methods may be implemented in software that is cloud-based.

The components shown in FIG. 6 are depicted as being connected via a single bus 690. The components may be connected through one or more data transport means. Processor units 610 and main memory 620 are connected via a local microprocessor bus, and mass data storage 630, peripheral devices 680, the portable storage device 640, and graphics display system 670 are connected via one or more input/output buses.

Mass data storage 630, which can be implemented with a magnetic disk drive, solid state drive, or an optical disk drive, is a non-volatile storage device for storing data and instructions for use by processor units 610. Mass data storage 630 stores the system software for implementing embodiments of the present disclosure for purposes of loading that software into main memory 620.

The portable storage device 640 may operate in conjunction with a portable non-volatile storage medium, such as a floppy disk, a compact disk, a Digital Versatile Disc (DVD), or a Universal Serial Bus storage device, to input and output data and code to and from the computer system 600. The system software for implementing embodiments of the present disclosure is stored on such a portable medium and input to the computer system 600 via the portable storage device 640.

User input devices 660 may provide a portion of a user interface. User input devices 660 include one or more microphones; an alphanumeric keypad, such as a keyboard, for inputting alphanumeric and other information; or a pointing device, such as a mouse, a trackball, stylus, or cursor direction keys. User input devices 660 can also include a touchscreen. Additionally, the computer system 600 includes output devices 650. Suitable output devices include speakers, printers, network interfaces, and monitors.

Graphics display system 670 may include a liquid crystal display or other suitable display device. Graphics display system 670 may receive textual and graphical information and processes the information for output to the display device. Peripheral devices 680 may include any type of computer support device to add additional functionality to the computer system.

The components provided in the computer system 600 of FIG. 6 may include those typically found in computer systems that may be suitable for use with embodiments of the present disclosure and are intended to represent a broad category of such computer components that are well known in the art. Thus, the computer system 600 can be a personal computer, handheld computing system, telephone, mobile computing system, workstation, tablet, phablet, mobile phone, server, minicomputer, mainframe computer, or any other computing system. The computer may also include different bus configurations, networked platforms, multi-processor platforms, and the like. Various operating systems may be used including UNIX, LINUX, WINDOWS, MAC OS, PALM OS, ANDROID, IOS, QNX, and other suitable operating systems.

It is noteworthy that any hardware platform suitable for performing the processing described herein is suitable for use with the embodiments provided herein. Computer-readable storage media refer to any medium or media that participate in providing instructions to a central processing unit, a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a Compact Disk Read Only Memory disk, DVD, Blu-ray disc, any other optical storage medium, RAM, Programmable Read-Only Memory, Erasable Programmable Read-Only Memory, Electronically Erasable Programmable Read-Only Memory, flash memory, and/or any other memory chip, module, or cartridge.

In some embodiments, the computer system 600 may be implemented as a cloud-based computing environment, such as a virtual machine operating within a computing cloud. In other embodiments, the computer system 600 may itself include a cloud-based computing environment, where the functionalities of the computer system 600 are executed in a distributed fashion. Thus, the computer system 600, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud may be formed, for example, by a network of web servers that include a plurality of computing devices, such as the computer system 600, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

Thus, methods and systems for training a simulated robot to execute tasks in a physics-based simulated environment have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A system for training a simulated robot to execute tasks in a physics-based simulated environment, the system including:
 a physically plausible virtual runtime environment to simulate a real environment for the simulated robot;
 a processor configured to:
  receive task data;
  based on the task data, create a plurality of plausible tests for at least one robot control program, the plurality of plausible tests being designed to execute at least one task associated with the task data; and
  define test parameters for each of the plurality of plausible tests; and
 a robot controller configured to:
  execute the plurality of plausible tests substantially simultaneously on the simulated robot;

analyze test results of the execution to select an optimized robot control program from the at least one robot control program;
based on the analysis, selectively optimize a plausible test associated with the optimized robot control program; and
a physical robot configured to execute the plausible test upon running the optimized robot control program on the robot controller.

2. The system of claim 1, wherein the physically plausible virtual runtime environment includes:
a Graphics Processing Unit (GPU)-based collision detection mechanism to compute contacts between at least two 3-dimentional (3D) geometries in real time;
a Finite Element Method (FEM)-based mechanism for virtual prototyping of rigid-body physical objects and soft-body physical objects in real time;
a mechanical simulation framework for providing plausible mechanical behavior based on Newtonian physics;
a Hardware-in-the-loop (HWIL) simulation framework configured to interface between the robot controller and the physically plausible virtual runtime environment; and
a software framework for testing and optimizing robot control software based on data computed in the physically plausible virtual runtime environment or provided to the physically plausible virtual runtime environment.

3. The system of claim 2, wherein the GPU-based collision detection mechanism is to employ General Purpose Graphics Processing Unit (GPGPU) hardware to check Computer-Aided Design (CAD)-constructed 3D geometries for possible contacts.

4. The system of claim 2, wherein the GPU-based collision detection mechanism is to employ a hybrid bounding volume hierarchy and a spatial hashing approach to allow for a high degree of parallelized processing.

5. The system of claim 2, wherein the GPU-based collision detection mechanism is to employ a hybrid geometry data representation that combines both polygonal surface descriptions and a compressed point cloud data format to enable an operation of both spatial hashing and geometry feature-based intersection computation approaches.

6. The system of claim 2, wherein the GPU-based collision detection mechanism is optimized for virtual environments with a high number of possibly intersecting, moving concave triangle meshes and wherein both geometric data representation and scheduling strategies are employed for planning and executing intersection checks.

7. The system of claim 1, further comprising a database operable to store data associated with an indexing, searching, and retrieval architecture for robots, tools, workpieces, and working environments, mechanical and material properties of objects, kinematics, mechatronic properties and behavior models of robots, mechatronic properties and behavior models of actuators, sensors, template building blocks for trajectories, motion plans, object recognition, handling and manipulation tasks, and patterns and a framework supporting decision making Artificial Intelligence software.

8. A method for training a robot to execute a task in a physics-based simulated environment, the method comprising:
determining, by a processor, a physically plausible virtual environment for a simulated robot;
receiving, by the processor, task data;
based on the task data, creating, by the processor, a plurality of plausible tests for at least one robot control program, the plurality of plausible tests being designed to execute at least one task associated with the task data;
defining, by the processor, test parameters for each of the plurality of plausible tests;
executing, by a robot controller, the plurality of plausible tests substantially simultaneously on the simulated robot;
analyzing, by the robot controller, test results of the execution to select an optimized robot control program from the at least one robot control program;
based on the analysis, selectively optimizing, by the robot controller, a plausible test associated with the optimized robot control program; and
executing, by a physical robot, the plausible test upon running the optimized robot control program on the robot controller.

9. The method of claim 8, wherein the plurality of plausible tests includes at least one of the following: tests of the same scenario for different control programs, tests of different scenarios for the same control program, and tests of the same scenario with different test parameters.

10. The method of claim 8, further comprising providing a human-machine interface (HMI) operable to receive the task data using at least one of the following: a text, a voice, and a gesture.

11. The method of claim 8, wherein the selective optimization of the plausible test includes:
classifying the test results into categories, wherein the plausible test is associated with at least one category; and
optimizing the plausible test based on the at least one category.

12. The method of claim 11, wherein the categories include at least one of the following: a success, a fail, a partial success, and a near success based on meeting at least one of the following criteria: spatial, temporal, and logical, and wherein the task data includes user defined result criteria.

13. The method of claim 8, further comprising:
determining, based on predetermined criteria, that further optimization is needed to the at least one robot control program associated with at least one of the plurality of plausible tests before the optimized robot control program is selected; and
based on the determination, adjusting the at least one robot control program.

14. The method of claim 8, wherein the optimization includes adjusting the test parameters based on the test results of executing the plurality of plausible tests, wherein the test parameters are adjusted automatically.

15. The method of claim 8, wherein the task data is obtained from a historical database or test execution data associated with the test results stored to the historical database.

16. The method of claim 15, wherein the storing of the test execution data to the historical database includes storing the optimized robot control program with associated test cases and corresponding simulation results.

17. The method of claim 16, wherein the plausible sensory data includes at least one of the following: an electrical emulation of a sensor, an electrical emulation of an actuator, visual data, tactile data, ambient data, and visual feedback of an execution of the optimized robot control program on the simulated robot.

18. The method of claim 17, wherein the execution of the optimized robot control program on the simulated robot includes at least one of the following: an actuator movement and an object manipulation.

19. The method of claim 8, wherein the optimization includes minimizing execution time or movement distances during task execution.

20. The method of claim 8, further comprising varying ambient conditions during the execution of the plurality of plausible tests.

21. The method of claim 8, wherein the task data is indicative of at least one part of a robot control program to be tested.

22. The method of claim 8, further comprising:
logging events occurring during the execution of the plurality of plausible tests;
defining passing criteria for the plurality of plausible tests; and
comparing the test results of the execution to the passing criteria, wherein the selecting of the optimized robot control program is based on whether the passing criteria are satisfied.

23. The method of claim 8, further comprising automatically selecting the at least one task for the plurality of plausible tests based on a description of the at least one task in the task data.

24. The method of claim 8, wherein the task data is associated with at least one of the following: a gripping process and a combination of a plurality of subtasks.

25. The method of claim 8, wherein the determining the physically plausible virtual environment of the simulated robot includes:
recognizing at least one object; and
classifying the at least one object based on data received from a digital twin catalog.

26. The method of claim 25, wherein the classification is based on at least one of the following properties: a viscosity, a mass, a rigidity, a fragility, a shape, a physical behavior, and a kinematical behavior.

27. The method of claim 25, further comprising:
obtaining, based on the classification, further data concerning the at least one object from metadata of a digital twin; and
generating the physically plausible virtual environment based on the metadata.

28. The method of claim 8, further comprising triggering one or more predetermined actions based on the test results of execution of the plurality of plausible tests.

29. A system for training a simulated robot to execute tasks in a physics-based simulated environment, the system including:
a physically plausible virtual runtime environment to simulate a real environment for the simulated robot;
a human-machine interface (HMI) operable to receive task data, the HMI being operable to receive commands using at least one of the following: a text, a voice, and a gesture;
a processor configured to:
create a plurality of plausible tests based on the task data for at least one robot control program, the plurality of plausible tests being designed to execute at least one task associated with the task data, wherein the plurality of plausible tests includes at least one of the following: tests of the same scenario for different control programs, tests of different scenarios for the same control program, and tests of the same scenario with different test parameters;
define test parameters for each of the plurality of plausible tests;
a robot controller configured to:
execute the plurality of plausible tests substantially simultaneously on the simulated robot;
analyze test results of the execution to select an optimized robot control program from the at least one robot control program; and
based on the analysis, selectively optimize a plausible test associated with the optimized robot control program, the selective optimization including classifying the results of execution into categories, and modifying results of execution based on the categories including, wherein the categories include at least one of the following: a success, a fail, a partial success, and a near success, wherein the success is based on meeting at least one of the following criteria: spatial, temporal, and logical; and
a physical robot configured to execute the plausible test upon running the optimized robot control program on the robot controller.

* * * * *